United States Patent [19]

Khoylian et al.

[11] Patent Number: 4,503,968
[45] Date of Patent: Mar. 12, 1985

[54] RELATCH ASSEMBLY FOR A CONVEYOR SYSTEM

[75] Inventors: Rouzas R. Khoylian, Belmont, Mass.; James R. Cowdery, Pellham, N.H.; David B. Park, Wilmington, Mass.

[73] Assignee: Santrade Ltd., Luzerne, Switzerland

[21] Appl. No.: 397,208

[22] Filed: Jul. 12, 1982

Related U.S. Application Data

[63] Continuation of Ser. No. 149,448, May 13, 1980, abandoned.

[51] Int. Cl.³ .............................................. B65G 37/00
[52] U.S. Cl. ..................................................... 198/472
[58] Field of Search ............... 198/472, 473, 648, 681, 198/614, 482, 484, 487, 488, 740, 796, 576, 578; 34/149; 62/380, 382; 99/443 C

[56] References Cited

U.S. PATENT DOCUMENTS

| | | | |
|---|---|---|---|
| 2,874,650 | 2/1959 | Royer | 198/614 |
| 2,897,772 | 8/1959 | Hunter | 198/472 |
| 3,570,647 | 3/1971 | Meikle et al. | 198/484 |
| 3,993,189 | 11/1976 | Khoylian et al. | 198/472 |
| 4,232,779 | 11/1980 | Khoylian et al. | 198/472 |
| 4,324,326 | 4/1982 | Khoylian et al. | 198/472 |

FOREIGN PATENT DOCUMENTS 183778  5/1963  Sweden ............... 198/796

Primary Examiner—Joseph E. Valenza
Attorney, Agent, or Firm—Burns, Doane, Swecker & Mathis

[57] ABSTRACT

The relatch assembly employs a trackway of articulated sections which are reciprocated vertically while a carriage is reciprocally driven along the trackway sections to engage a carrier on the descending elevator. The articulated trackway sections permit engagement of a carrier and subsequent pulling of the carrier from the descending elevator. A ramp is also provided to act in synchronism with the trackway sections to support a carrier being pulled from the elevator. The carriage is cycled twice during the time one carrier is pulled from the elevator into relatching engagement with the main conveyor. During the second cycle, the trackway sections remain in a lowermost position.

25 Claims, 8 Drawing Figures

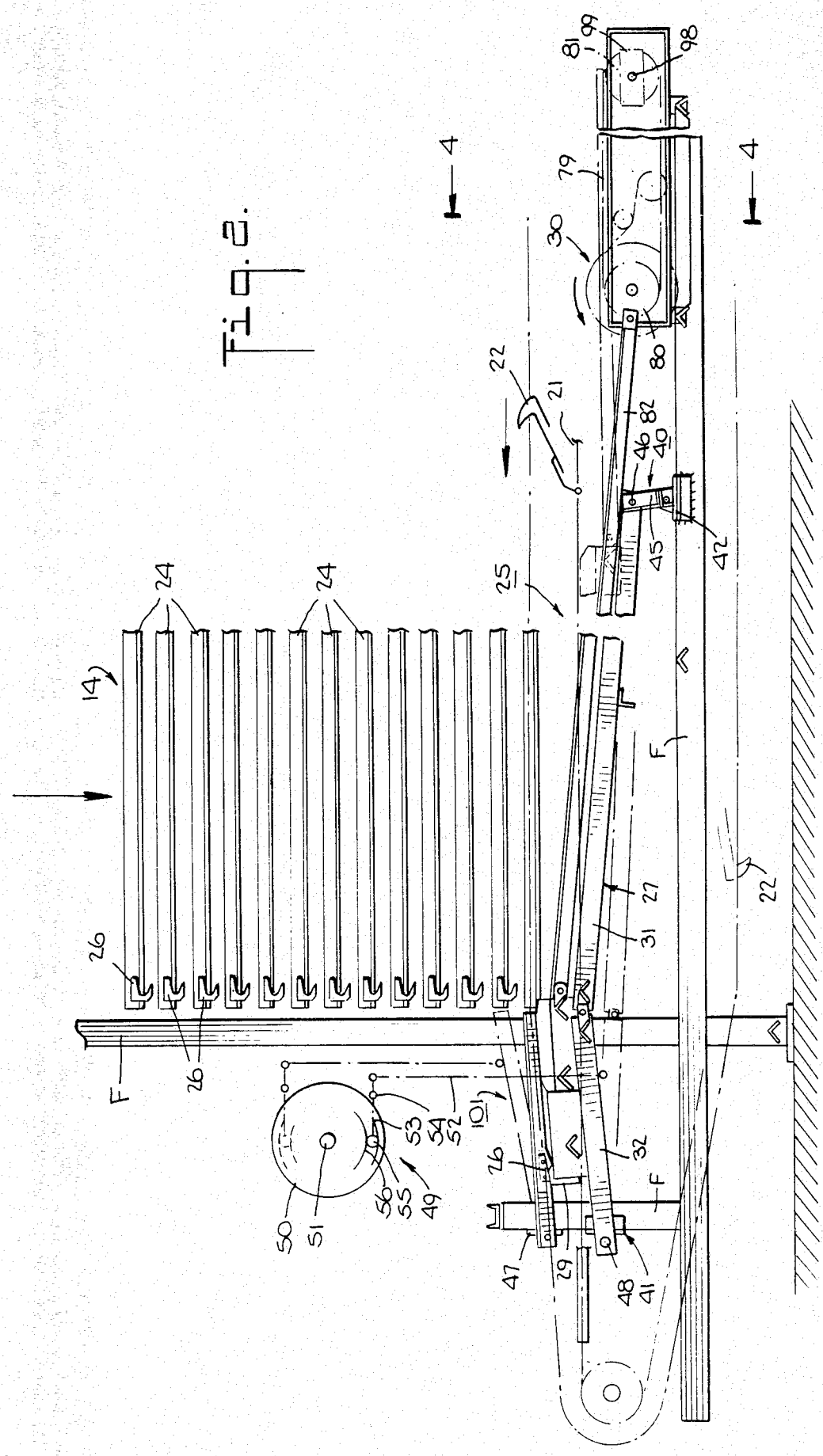

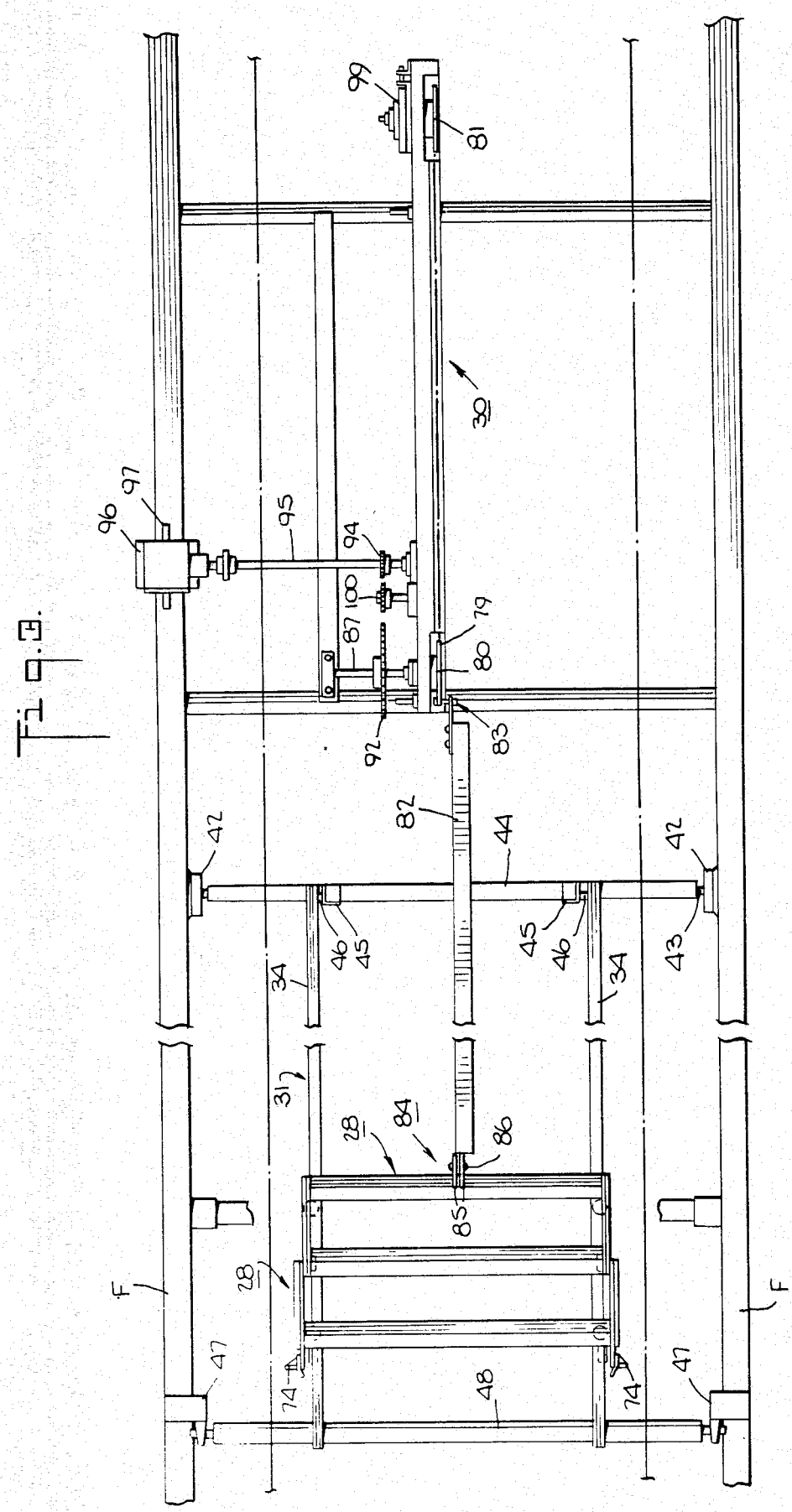

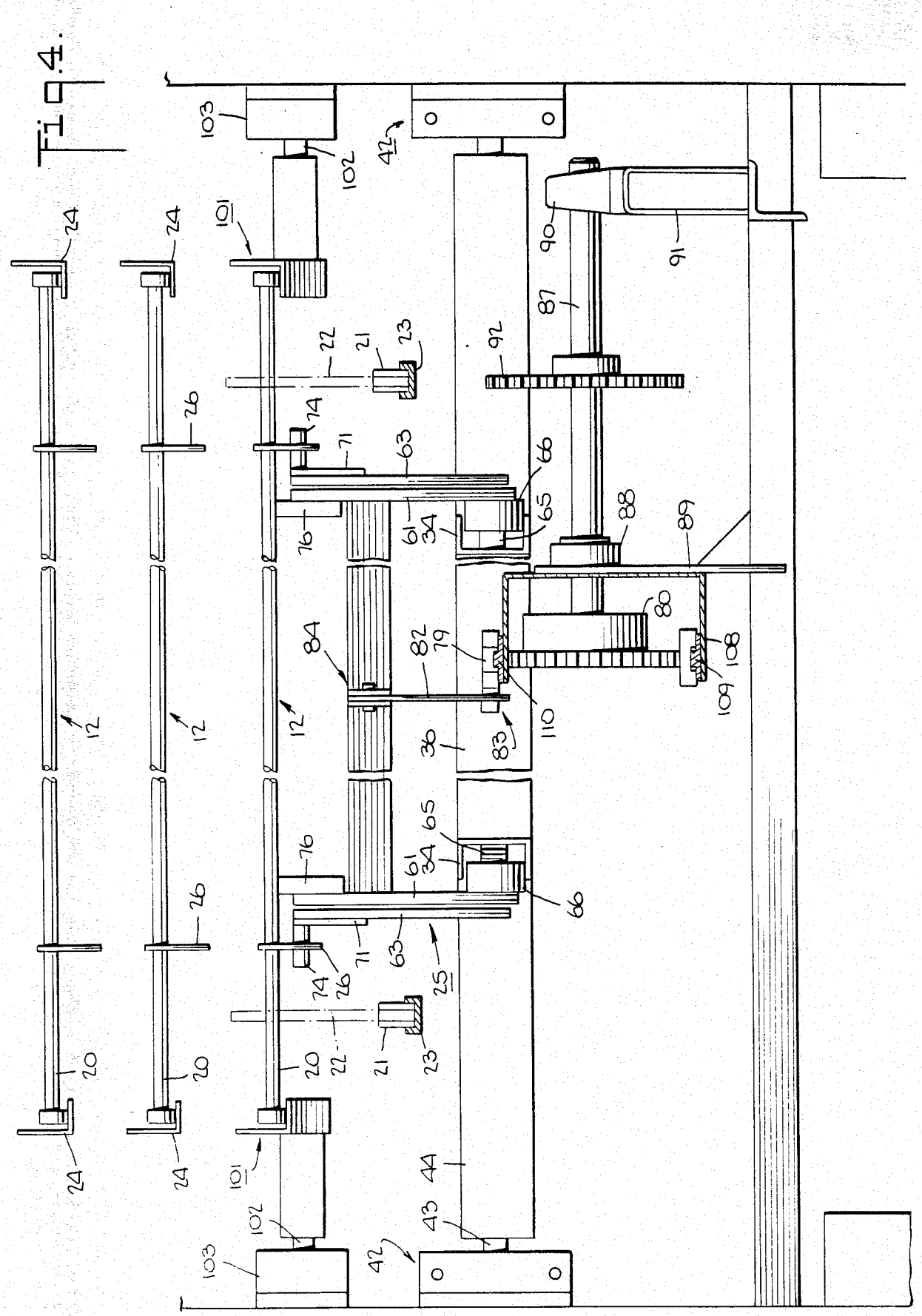

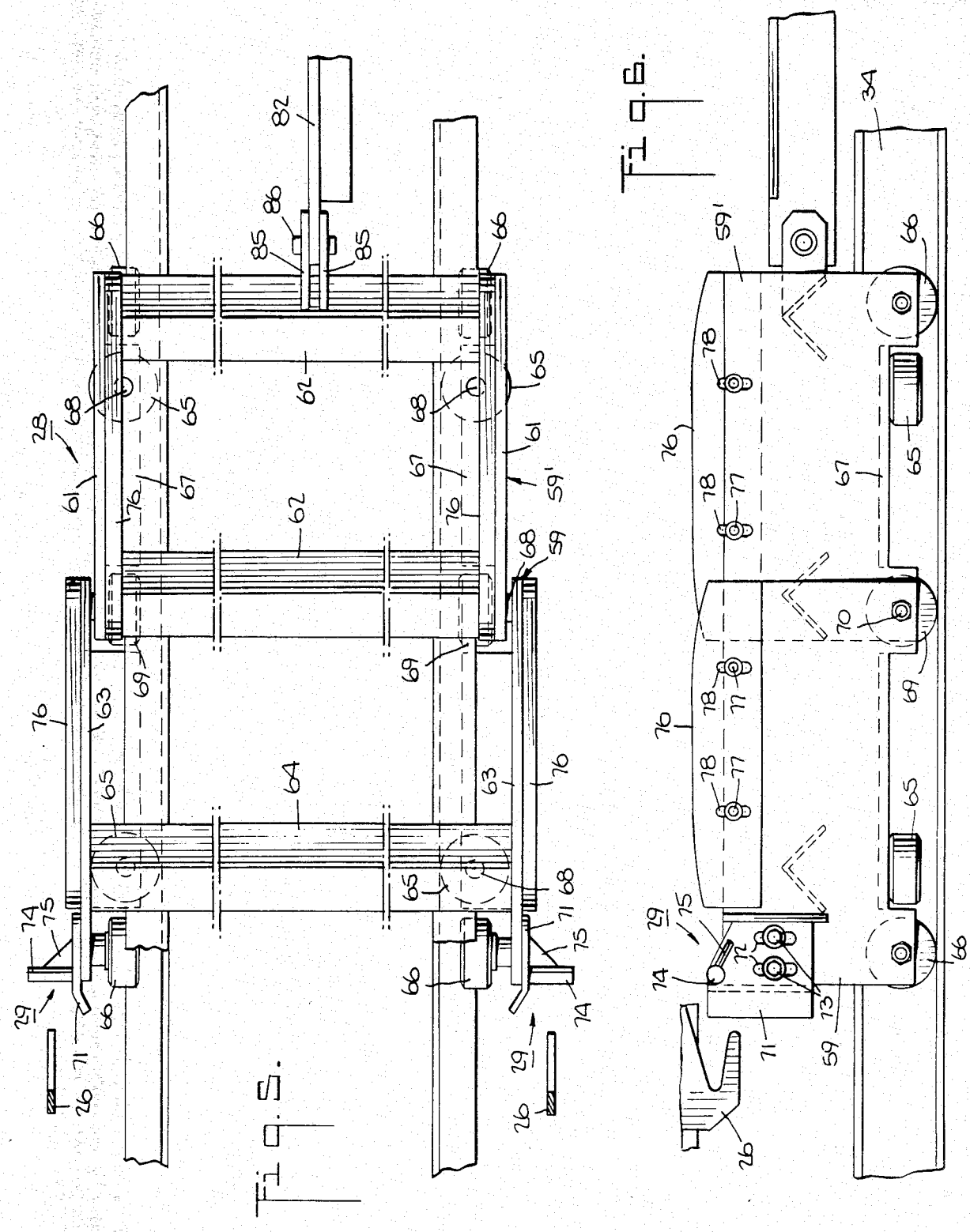

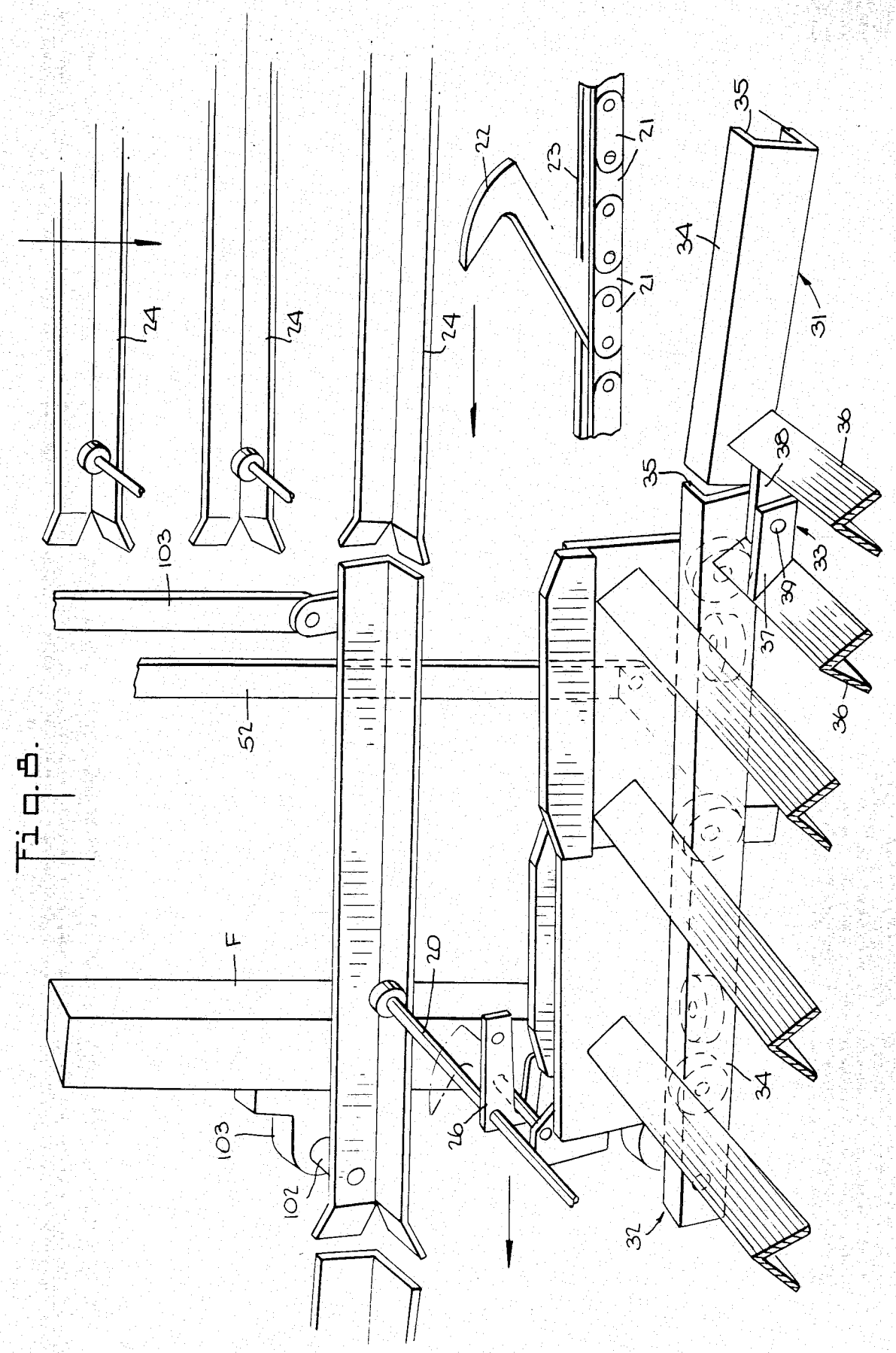

RELATCH ASSEMBLY FOR A CONVEYOR SYSTEM

This is a continuation of application Ser. No. 06/149,448, filed May 13, 1980, which is now abandoned.

This invention relates to a relatch assembly for a conveyor system.

As is known, various types of conveyor systems have been constructed to convey products along paths which are oriented in different manners from each other. Generally, in order to effect delivery of the conveyed products from one conveyor to the other, various means have been employed. However, in the case where the conveyors are aligned in different planes, for example one in a vertical plane and one in a horizontal plane, it has been difficult to maintain a smooth continuous conveyance of the products in a simple manner.

It has also been known, for example, as described in U.S. Pat. No. 3,993,189, to convey products on flexible mats or carriers which are moved from a vertically disposed conveyor such as a descending elevator onto a horizontally disposed conveyor via hooks on the carrier which engage cross-rods on the endless chains of the horizontal conveyor. As described, as a mat on the descending elevator arrives at a point of discharge, a synchronously driven chain brings a pin into engagement with a pair of yokes which rotate two spiders to engage the forward portion of the mat. The spiders then carry the mat forwardly so that hooks on the mat can engage with a transverse cross-rod on the main chain of the horizontal conveyor and, thus, permit the mat to be pulled out of the descending elevator.

Because of the need to time the actuation of the yokes with respect to the descending movement of the mats, the timing must be relatively precise to ensure that a mat is properly engaged. Further, the timing must be sufficiently precise to permit the transverse cross-rod of the main conveyor chain to be engaged by the hooks of a mat. If engagement is not carried out, the mat would remain on the descending elevator and, thus, interfere with the proper functioning of the overall conveyor system.

Accordingly, it is an object of the invention to provide for a smooth transition of a carrier from a descending elevator onto a horizontally disposed conveyor.

It is another object of the invention to provide a relatively simple relatch assembly for sequentially relatching and moving a series of product carrying carriers from a vertically disposed conveyor onto a horizontal conveyor.

It is another object of the invention to provide a relatch assembly for moving flexible carrier mats in a simple reliable manner without inparting undue stresses therein.

Briefly, the invention is directed to a conveyor system which has a plurality of carriers, each of which has a rod at a forward end with a pair of depending hooks thereon, a main conveyor for moving a sequential series of the carriers along a horizontal path via hooks on an endless chain and an elevator having pairs of opposed tracks disposed in vertically stacked relation for sequentially conveying the carriers in a descending vertical plane. In accordance with the invention, a relatch assembly is provided for sequentially moving each carrier from a respective pair of tracks on the descending elevator into relatched relation with the main conveyor.

The relatch assembly is comprised of a trackway which is located below the elevator, a carriage which is movably mounted on the trackway and provided with a pair of rod means to engage respective depending hooks on the rod of the carrier, and means for reciprocating the carriage on the trackway so that the rod means move from below the elevator into engagement with the depending hooks of a carrier on a lowermost pair of tracks of the elevator. This allows the carriage to pull the carrier from the elevator into the path of the hooks of the main conveyor for subsequent engagement with at least one hook of the main conveyor.

In order to accomodate the descending motion of the elevator, the trackway is constructed with a pair of sections which are articulated to each other at respective ends so as to move up and down. Also, one section is hingedly mounted at an opposite end and extends below the plane of the elevator while the other section is pivotally mounted at an opposite end about a pivot point outside the plane of the elevator. The trackway sections are mounted so as to move between a coaxial aligned position and an inverted V-shaped position. To this end, the relatch assembly also comprises means for moving the trackway sections vertically in synchronism with movement of the carriage along the trackway sections. In this way, the trackway sections are caused to move vertically upwardly into the inverted V-shaped position while the carriage is moved upwardly towards a point of engagement with a carrier on the descending elevator and, thereafter, vertically downwardly as the carriage is moved downwardly with the engaged carrier.

The carriage is constructed of a pair of articulated sections with a forward one of the sections having the rod means for engaging a carrier mounted thereon. Each of these sections has a frame and wheel means which are mounted on the frame for rollably moving the frame along the trackway sections. To this end, each trackway section includes a pair of longitudinally disposed channel-shaped rails which are disposed in outwardly facing relation while the wheel means includes a pair of rollers disposed within each rail to rotate about vertical axes and horizontal axes, respectively, along the rails. Further, each of the carriage sections has guide rails on the upper side for supporting a carrier thereon during removal of the carrier from the tracks of the descending elevator. Also, each rod means is in the form of a horizontally disposed pin for engaging a respective depending hook of a carrier.

The means for reciprocating the carriage includes an endless chain and an arm articulated at one end to the chain for movement therewith and articulated to the carriage frame at an opposite end. The endless chain is looped about a pair of rollers below the path of the chain of the main conveyor to have an upper run and a parallel lower run whereby the carriage moves along the trackway towards the elevator during movement of the arm along the upper chain run and away from the elevator during movement of the arm along the lower chain run. In addition, the forwardmost roller is positioned in correspondence to the movements of the hooks of the main conveyor to permit disengagement of a carrier from the carriage prior to a return stroke of the carriage.

In order to aid the movement of a carrier from the elevator, the main conveyor includes a pivotally mounted ramp which is positioned above the pivotally mounted trackway section for sequentially receiving and guiding each carrier from the elevator onto suitable guide tracks of the main conveyor. The ramp is also provided with means for aligning the ramp with a respective pair of tracks of the elevator in order to receive a carrier and to permit the ramp to pivot downwardly while the elevator tracks move downwardly during movement of a carrier thereon.

The means for moving the trackway sections is also connected to the ramp in order to move the ramp vertically upwardly in synchronism with the movement of the trackway. This means for moving both the trackway and ramp may be in the form of a rotatably mounted cam having two cam grooves and two cam rods connected respectively to the trackway and ramp via suitable levers and cam rollers to ride in the respective grooves of the cam. In this way, as the cam rotates through one cycle, the ramp can be raised to engage a descending pair of tracks on the elevator while the trackway is reciprocated between the inverted V-shaped position to the co-axial position and back.

When in use, the carriage is reciprocated along the trackway while the trackway is cycled up and down in timed sequence to the descending elevator tracks. For example, as the lowermost carrier in the elevator approaches a take-off position, the trackway is moved upwardly into the inverted V-shape position while the carriage rides upwardly along the first trackway section. As the carriage approaches the apex of the trackway, the carrier is engaged. Thereafter, the carriage top surface supports the carrier as the carrier is pulled from the descending elevator. The trackway descends following the path of the descending carrier so that carriage and carrier are following the same path. During this time, the ramp ascends to support the carrier, then also follows the descending path of the carrier in timed relationship. After this occurs, the carriage slows to a stop and retracts, leaving the carrier stationary for a short time during which the hooks on the main conveyor engage the front rod of the carrier and continue to transport the carrier as required.

At this time, the trackways descend further so that continued motion of the carrier may proceed without interfering with the further retraction of the carrier from the downward descending elevator.

These and other objects and advantages of the invention will become more apparent from the following detailed description and appended claims taken in conjunction with the accompanying drawings in which:

FIG. 3 illustrates a plan view of the relatch assembly of FIG. 2;

FIG. 4 illustrates a view taken on line 4—4 of FIG. 2;

FIG. 5 illustrates a plan view of a carriage of the relatch assembly in accordince with the invention;

FIG. 6 illustrates a side view of the carriage of FIG. 5;

FIG. 7 illustrates a cam for moving a trackway section and a ramp in accordance with the invention; and FIG. 8 illustrates a perspective view of various parts of the relatch assembly in cooperation with a descending elevator, ramp and main chain of a conveyor system in accordance with the invention.

Figure 1:
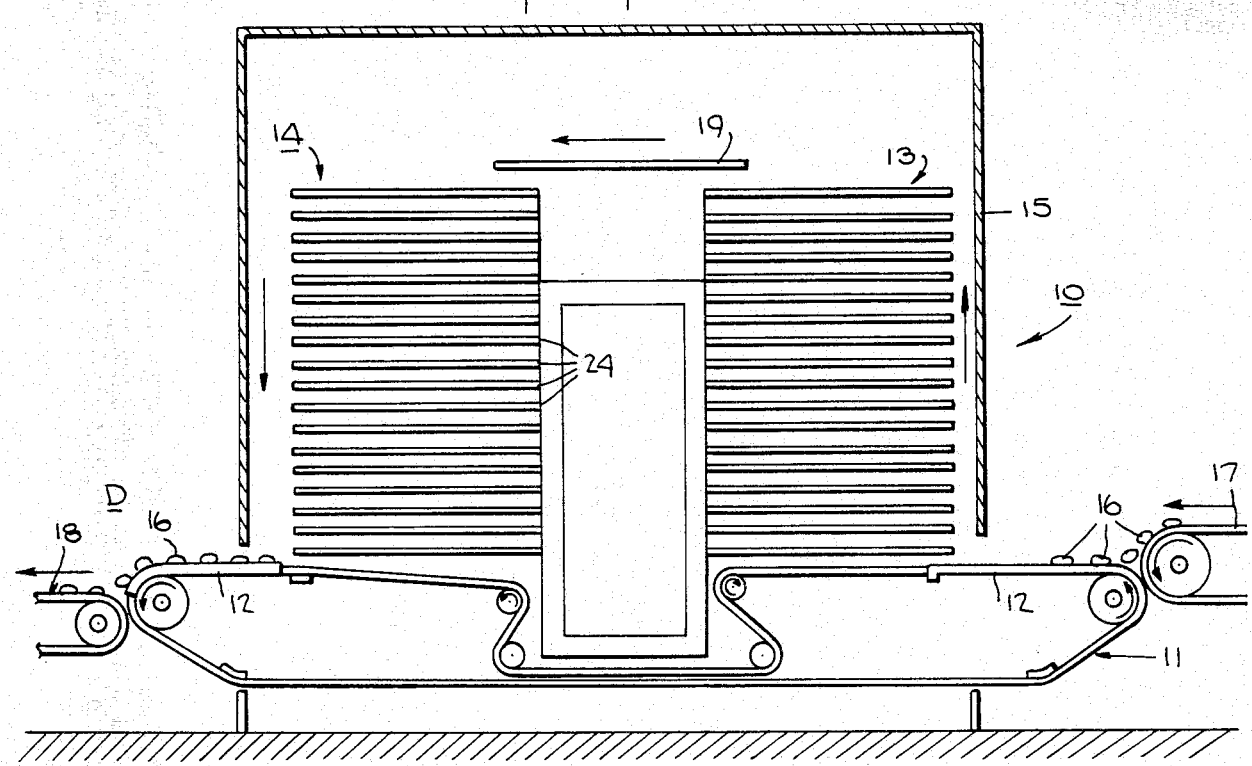
FIG. 1 illustrates a schematic view of a conveyor system utilizing a relatch mechanism according to the invention.

Referring to FIG. 1, the conveyor system is constructed in a manner similar to that as described in U.S. Pat. No. 3,993,189. In this regard, the conveyor system 10 includes a horizontally disposed main conveyor 11 for moving a sequential series of vertically disposed conveyors 13, 14 in the form of elevators within a housing 15 for sequentially receiving and conveying the carriers 12 in a vertical plane. As shown, the main conveyor 11 has an infeed end at a loading station L for receiving products 16, such as foodstuffs, from an infeed conveyor 17 and a discharge end for discharging the product after treatment at a delivery station D onto a discharge conveyor 18. The two elevators 13, 14 are disposed within the housing 15 to receive the carriers 12 from the main conveyor 11 for treatment, for example, for heating, drying, cooling, freezing, thawing, or the like, of the products 16 on the carriers 12. A suitable transfer mechanism 19 is provided at the upper ends of the two elevators 13, 14 in order to transfer the carriers 12 therebetween.

Each carrier 12 is of a type similar to that described in U.S. Pat. No. 3,993,189 and is made with a plurality of rods 20 (see FIG. 8) which are interconnected by chain links (not shown).

The main conveyor 11 has one or more endless chains 21, each of which has a pluality of longitudinally spaced hooks 22 for respectively engaging the foremost rod 20 of each respective carrier 12. Each chain 21 is guided via a suitable guide 23 along a horizontal path extending under the descending elevator 14. Each hook 22 is pivotally mounted on a chain 21 in suitable manner and is sized to engage the rod 20 of a respective carrier 12. For example, where two chains 21 are used, two hooks 22 engage the rod 20, one near each end as indicated in FIG. 4.

The descending elevator 14 is constructed with pairs of opposed tracks 24 which are disposed in vertically stacked relation for sequentially receiving the carriers 12 and for conveying each carrier 12 in a vertical plane. The construction of the elevator 14 is otherwise known and need not be further described.

Figure 2:
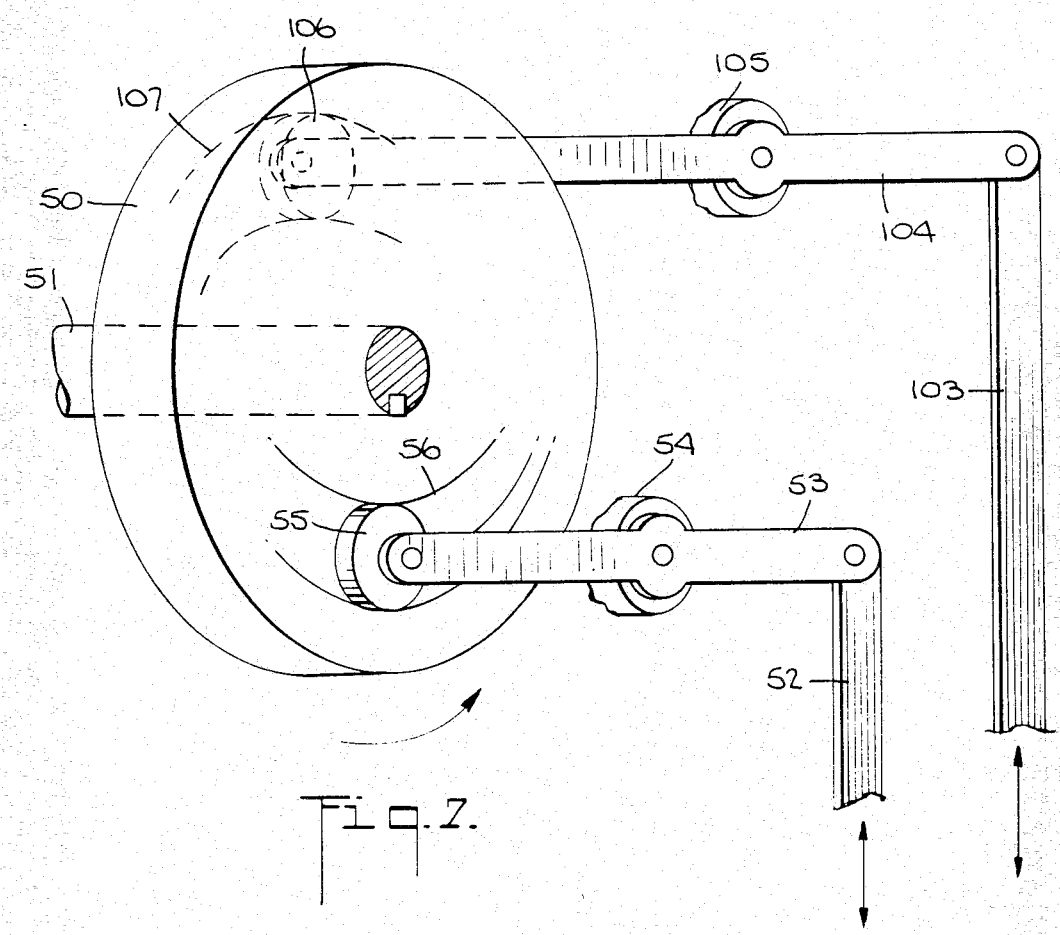
FIG. 2 illustrates a side view of a relatch assembly and a descending elevator of a conveyor system in accordance with the invention.

Referring to FIG. 2, a relatch assembly 25 is positioned below the descending elevator 14 in order to sequentially remove each carrier from a respective pair of tracks of the descending elevator and into relatched relation with the main conveyor 11. In this regard, each carrier 12 on the descending elevator 14 has a pair of depending hooks 26 on the foremost rod 20, each of which is located near one end.

The relatch assembly 25 includes a trackway 27 below the elevator 14, a carriage 28 which is movably mounted on the trackway 27 and which has pair of rod means 29 to engage a respective hook 26 of a carrier 12, and means 30 for reciprocating the carriage 28 on the trackway 27. As the carriage 28 reciprocates, the rod means 29 moves from below the elevator 14 into engagement with the depending hooks 26 of a carrier 12 on a lowermost pair of tracks 24 of the elevator 14 in order to pull the carrier 12 from the elevator 14 and into the path of the hooks 22 of the main conveyor 11 for subsequent engagement with the hooks 22.

Referring to FIGS. 2 and 8, the trackway 27 is formed of a pair of sections 31, 32 which are articulated to each other at respective ends via two hinge joints 33. As shown in FIG. 8, each track section 31, 32 is formed of a pair of channel shaped rails 34 with outwardly extending flanges 35 which are interconnected by transverse struts 36 in the form of structural angles. In addition, each hinge joint 33 (only one of which is shown) is formed by a pair of plates 37 fixed to one strut 36 of one track section 32, a single plate 38 which is fixed to a transverse strut 36 of the opposed track section 31 and a shoulder bolt 39 which passes through the respective plates 37, 38 and is held in place by a suitable lock nut. Suitable bushings and flange bearings (not shown) may also be located between the plates 37, 38 to reduce friction. Each hinge joint 33 functions to permit the two track sections 31, 32 to move between a coaxial aligned position as shown in dotted line in FIG. 2 and an inverted V-shaped position as shown in solid line in FIG. 2.

As shown in FIG. 2, the rear track section 31 is hingedly mounted at one end via an articulated joint 40 and extends below the plane of the elevator 14 while the forward track section 32 is pivotally mounted at an opposite end on a pivot 41 outside the plane of the elevator 14. The articulated joint 40 is disposed near the rear end of the track section 31 to permit a vertical motion as well as a horizontal motion in the track section 31. This articulated joint 40 includes a pair of bearings 42 which are fixedly mounted on opposite sides of the frame F of the conveyor system 10 (see FIG. 3), a shaft 43 which is journalled in the bearings 42, an elongated angle 44 secured to the shaft 43 and a pair of upstanding struts 45 which are fixed on the angle 44 adjacent opposite rails 34 of the track section 31. Each strut 45 is, in turn, connected via a pivot pin or bolt 46 to a rail 34 to pivot about a horizontal axis. The track section 31 is thus able to pivot not only about the axis of the bearings 42 but also about the axis of the pins 46 on the track section 31. The track section 31 thus has two degrees of motion, i.e., vertical and horizontal.

The pivot 41 on which the forward track section 32 is mounted includes a pair of bearings 47 fixed on opposite sides of the frame F of the conveyor system 10 (see FIG. 3) and a shaft 48 journalled in the bearings 47 and fixed to the rails 34 of the track section 32. In this way, the rearmost track section 32 has one degree of motion, i.e., vertical.

Referring to FIG. 2, a means 49 is also provided for moving the trackway sections 31, 32 vertically in synchronism with movement of the carriage 28 along the sections 31, 32 whereby the sections 31, 32 move vertically upward until the carriage 28 engages a respective carrier 12 and then move vertically downward. This means 49 includes a cam 50 rotatably mounted on a shaft 51 (as shown in FIG. 7) synchronized to rotate with the conveyor system 10, a cam rod 52 connected to the trackway section 32 (for example to a transverse bar fixed to the underside section 32), a lever 53 pivotally mounted on a fixed pivot 54 and fixed to the rod 52, and a cam roller 55 mounted on the lever 53 and disposed in a groove 56 of the cam 50. The groove 56 is shaped to cause a lifting motion of the lever 53 only at certain times. Otherwise, the groove 56 is co-axial and concentric with the shaft 51. Upon rotation of the cam 50, the cam roller 55 follows the contour of the cam groove 56 and causes the layer 53 to pivot. This, in turn, causes the cam rod 52 to move vertically and, thus, effect the vertical motion of the trackway section 32 and, thus, the following motion of the trackway 31.

Referring to FIGS. 4, 5 and 6, the carriage 28 includes a pair of articulated sections 57, 58 each of which has a frame 59 and wheel means 60 mounted thereon for rollably moving each frame 59 along the trackway sections 31, 32.

The rear carriage frame 59' is constructed of a pair of side plates 61 which are interconnected together by a pair of transverse struts 62 in the form of structural angles. The front carriage frame 59 is also constructed of a pair of side plates 63 which are interconnected by a single transverse strut 64 in the form of a structural angle.

The wheel means 60 on each frame 59, 59' includes a pair of rollers 65 which are disposed within the rails 34 of the trackway 27 to rotate about vertical axes and a pair of rollers 66 which are disposed in the rails 34 to rotate about horizontal axes. In order to accommodate the horizontally disposed rollers 65, each side plate 61, 63 has an inwardly turned flange 67 upon which the rollers 65 are mounted, for example, via shoulder bolts 68.

As indicated in FIGS. 5 and 6, a pair of rollers 69 are mounted in common between the frames 59, 59' on bolts 70 which are fixed to a side plate 63 of the forward carriage frame 59 and which pass through an aperture in the side plate 61 of the rear carriage frame 59'. A suitable bearing can be disposed within each side plate 61 of the rear carriage frame 59' to journal the bolt 70 therein.

As shown in FIGS. 5 and 6, the forward frame 59 mounts the two rod means 29 thereon. As shown in FIG. 6, each rod means 29 is formed of a mounting plate 71 which has a pair of elongated slots 72 receiving bolts 73 which thread into a side plate 63 in order to permit mounting of the mounting plate 71 in vertically adjustable relation. Also, each plate 71 carries a horizontally disposed pin 74 which extends outwardly from the carriage 28. Each pin 74 is reinforced by a suitable gusset plate 75 which is fixed, for example, by welding to the pin 74 and plate 71.

Each carriage frame 59, 59' also has an elongated support 76, for example made of plastic, mounted on the upper edge of each side plate 61, 63, for example via bolts 77 which are disposed in vertically elongated slots 78 in each support 76. This permits each support 76 to be adjusted vertically with respect to the carriage frame 28. The supports 76 serve to carry a carriage 12 thereon as described below.

Referring to FIGS. 2 and 3, the means for reciprocating the carriage 28 includes an endless chain 79 which is disposed to move about a pair of rollers 80, 81 such that the chain 79 has a pair of parallel horizontal runs. In addition, this means 30 includes an arm 82 in the form of an angle which is articulated at one end to the chain 79 for movement therewith and articulated to the carriage 28 at an opposite end. As indicated, in FIG. 3, the arm 82 is articulated to the chain 79 via a simple pin connection 83 while the opposite end is articulated to the rear carriage frame via a joint 84. As shown in FIGS. 5 and 6, this joint 84 includes a pair of vertical plates 85 which are fixed to the rear transverse strut 62 of the carriage frame 59' and a bolt 86 which passes through the two plates and an interposed flange of the arm 82.

As shown in FIG. 3, the forward roller 80 is mounted on a shaft 87 which is journalled in the frame F of the conveyor system 10 via a bearing 88 on a support 89 and a bearing 90 on a mount 91. The shaft 87 carries a sprocket 92 which is driven by a chain 93 from a sprocket 94 on a drive shaft 95 which, in turn, is connected via a gear box 96 with a power shaft 97 so as to be driven in synchronism with the conveyor system 10. The chain 93 can be tensioned via an idler 100 mounted on the support 89. The rear roller 81 is mounted on a shaft 98 which is journalled in a bearing 99 for free rotation.

When the arm 82 is moving along the upper run of the chain 79, the carriage 28 moves along the trackway 27 towards the elevator 14, i.e. vertically upward, and during movement of the arm 82 along the lower run, the carriage 28 moves along the trackway 27 away from the elevator, i.e. rearwardly and downwardly.

The forward roller 89 is positioned in correspondence to a hook 22 of the main conveyor 11 to permit disengagement of a rod means 29 from a carrier 12 prior to the return of the carriage 28.

Referring to FIG. 2, the main conveyor 11 also includes a pivotally mounted ramp 101 for sequentially receiving and guiding the carriers 12 from the elevator 14. As shown in FIG. 8, the ramp 101 is constructed of a pair of sections in the form of an angle on each side of the conveyor 11 each of which is mounted on a horizontal pin 102 which is journalled in a bearing 103 fixed to the frame F of the conveyor system 10. Also, the opposite end of each ramp section is connected to the means 50 for moving the trackway sections 31, 32 so as to move in synchronism therewith. As indicated, the end of each ramp section is connected to a connecting rod 103 which, in turn, is connected to a lever 104 (FIG. 4) at an upper end which is pivoted on a fixed pivot 105. The lever 104 carries a cam roller 106 at one end which is disposed within a second cam groove 107 of the rotatably mounted cam 50. The groove 16 is disposed on an opposite face of the cam 50 from the groove 56 for the trackway sections.

Referring to FIG. 4, a suitable channel-shaped guide frame 108 is mounted on the support 89 for guiding the runs of the chain 79 to avoid sagging of the runs. As shown, the guide frame 108 has T-shaped tracks 109, 110 thereon for guiding the respective runs of the chain 79.

Referring to FIGS. 2 and 8, in operation, as the elevator 14 is descending, the carriage 28 is moved from a rearmost position on a trackway section 31 via the chain 79 and connecting arm 82. During this time, the arm 82 moves along the upper run of the chain 79 while the trackway sections 31, 32 are raised from the coaxial dotted line position illustrated towards the inverted V-shaped position shown in FIG. 2. As the carriage 28 moves up the inclined track section 31, the horizontally disposed pins 74 of the rod means 29 move towards a point of engagement with the foremost rod 20 of the lowermost carrier 12 on the elevator 14. When the trackway 27 reaches the uppermost V-shaped position, the pins 74 contact with the depending hooks 26 of the carrier 12 and thus begin to pull the carrier 12 from the elevator tracks 24.

During this time, the carrier 12 is supported, in part, on the supports 76 of the carriage 28.

Thereafter, the trackway 27 descends with the trackway section 32 following the descent of the carrier 12 on the elevator 14 so that the carriage 28 and carrier 12 follow the same path. During this time, the ramp 101 ascends to support the carrier 12 and then descends to follow the path of the carrier 12 in timed relationship via the cam 50.

Subsequently, the carriage 28 slows to a stop and then retracts leaving the carrier 12 stationary for a short time during which the hooks 22 of the main conveyor 11 engage the front rod 20, as indicated in dotted line in FIG. 8 and continue to transport the carrier 12. The trackway 27 continues to descend so that continued motion of the carrier 12 may proceed without interfering with the retraction of the carriage 28 from the descending elevator 14.

Subsequently, the carriage 28 is returned to the initial position via the reciprocating means 30. During this time, the trackway sections 31, 32 are in the coaxially disposed position and the carriage 28 moves on a downwardly inclined angle back to the initial position. Next, the relatch assembly cycles a second time. However, in the second cycle, the track sections 31, 32 stay down, i.e., the track sections 31, 32 remain in the coaxial aligned position shown in dotted line in FIG. 2. Thereafter, the relatch assembly 25 is re-cycled to pull a second carrier from the elevator 14.

It is to be noted that the speed of the forward speed of the carriage 28 is faster than the speed of the hooks 22 on the conveyor chain 21 so as to permit disengagement of a carrier 12 from the carriage 28 by the conveyor hooks 22. Also, the cam 50 is constructed so as to cause the trackway sections 31, 32 to pivot upwardly at a faster rate, for example three times faster, than the rate of descent. In this way, the rod means 29 on the carriage 28 can be quickly moved into the plane of the hooks 26 of the carrier 12.

It is to be noted that the means 30 for reciprocating the carriage may be in the form of a two cycle system. In such a system, the length of chain 79 required to circulate the articulated arm 82 as well as the chain support channels and the like can be reduced. This, in turn, reduces the length of the track and the cost.

The invention thus provides a relatch assembly which is capable of relatively simple smooth operation and which reliably insures the relatching of a carrier on a descending elevator with a main conveyor chain.

The invention further provides a dependable relatch assembly which can be made of relatively simple parts. Also, the invention provides a relatch assembly which is able to move into engagement with a carrier in a simple manner without imparting undue stresses or impact forces thereon. Accordingly, the items carried on the carrier are not subjected to jostling which might otherwise affect the proper position of the items on the carrier for subsequent treatment.

The relatch assembly is adaptable to various tier pitches, for example for 5 inch or more tier pitches.

What is claimed is:

1. In combination with a conveyor system having a plurality of carriers, each said carrier having a rod at a forward end thereof and a pair of depending hooks on said rod; a main conveyor for moving a sequential series of said carriers along a horizontal path, said conveyor having a plurality of longitudinally spaced hooks for respectively engaging said rod of each respective carrier and an endless chain for moving said hooks of said conveyor along said path; and an elevator having pairs of opposed tracks disposed in vertically stacked relation for sequentially conveying said carriers in a descending vertical plane; a relatch assembly for sequentially moving each carrier from a respective pair of tracks of said elevator into relatched relation with said main conveyor, said latch assembly comprising a trackway below said elevator, said trackway having a pair of articulated movably mounted sections;

a carriage movably mounted in said trackway and having a pair of rod means to engage respective depending hooks on said rod of said carrier;

means for reciprocating said carriage on said trackway with said rod means moving into engagement with said depending hooks on a lowermost pair of tracks of said elevator to pull the carrier from said elevator and into said path for subsequent engagement with at least one respective hook of said main conveyor; and means for moving said trackway sections vertically in synchronism with movement of said carriage along said sections whereby said sections move vertically upwardly until said carriage engages a respective carrier and then move vertically downwardly.

2. The combination as set forth in claim 1 wherein said main conveyor includes a pivotally mounted ramp for sequentially receiving and guiding each carrier from said elevator; and means for aligning said ramp with a respective pair of said tracks of said elevator receiving a carrier thereon to permit said ramp to pivot downwardly while said respective pair of tracks moves downwardly in said vertical plane during movement of a carrier thereon.

3. The combination as set forth in claim 2 wherein said means for moving said trackway sections is connected to said ramp to move said ramp vertically upwardly in synchronism with the movement of said trackway.

4. The combination as set forth in claim 2 wherein one of said trackway sections is located below said elevator and the other of said trackway sections is located below said ramp.

5. The combination as set forth in claim 4 wherein said one trackway section is hingedly mounted at one end and said other trackway section is pivotally mounted at one end to move between a coaxial aligned position and an inverted V-shaped position.

6. The combination as set forth in claim 1 wherein said carriage includes a pair of articulated sections with a forward one of said sections having said rod means mounted thereon.

7. The combination as set forth in claim 6 wherein each section of said carriage has guide rails thereon for supporting a carrier thereon.

8. The combination as set forth in claim 6 wherein each rod means includes a horizontally disposed pin for engaging a respective depending hook of a carrier.

9. A relatch assembly for moving a carrier from a pair of tracks of an elevator into relatched relation with a main conveyor, said latch assembly comprising a trackway below said elevator, said trackway having a pair of articulated movably mounted sections;

a carriage movably mounted in said trackway and having a pair of articulated sections, one of said articulated sections having rod means to engage a carrier;

means for reciprocating said carriage on said trackway; and means for moving said trackway sections vertically in synchronism with movement of said carriage along said sections whereby said sections move vertically upwardly until said carriage engages a carrier and then move vertically downwardly.

10. A relatch assembly as set forth in claim 8 wherein said trackway sections are articulated to each other a respective ends thereof, one of said sections being hingedly mounted at an opposite end and the other of said sections being pivotally mounted at an opposite end thereof about a pivot point.

11. The combination as set forth in claim 9 wherein said means for moving said trackway section includes a rotatably mounted cam having a cam groove therein, a cam rod connected to said other trackway section and having a cam roller mounted thereon and disposed in said groove.

12. The combination as set forth in claim 8 wherein each said carriage section includes a frame and wheel means mounted on said frame for rollably moving said frame along said trackway sections.

13. In combination with a conveyor system having a plurality of carriers, a main conveyor for moving a sequential series of said carriers along a generally horizontal path, and an elevator having vertically spaced supports for sequentially conveying said carriers in a descending path; a relatch assembly for sequentially moving each carrier from said elevator supports into latched relation with said main conveyor, said relatch assembly comprising:

a carriage movably mounted along said trackway for vertical movement within said descending path of said carriers on said elevator, and means operably connected to said carriage for moving said carriage upwardly into engagement with a carrier to lift and support such carrier and then moving said carriage and its supported carrier simultaneously downwardly and horizontally to displace such carrier from said descending path and into said generally horizontal path for engagement with said main conveyor, said trackway including a pair of sections articulated to each other at respective ends thereof, one of said sections being hingedly mounted at an opposite end and extending below the plane of said elevator and the other of said sections being pivotally mounted at an opposite end thereof about a pivot point outside said plane of said elevator, and which further comprises means for moving said trackway sections vertically in synchronism with movement of said carriage along said sections wehreby said sections move vertically upwardly until said carriage engages a respective carrier and then move vertically downwardly.

14. A conveyor system for conveying a plurality of carriers, comprising a main conveyor for moving a sequential series of said carriers along a generally horizontal path, and an elevator having vertically spaced supports for sequentially conveying said carriers in a descending path; a relatch assembly for sequentially moving each carrier from said elevator supports into latched relationship with said main conveyor, said relatch assembly comprising:

a generally horizontal trackway having a portion thereof arranged in said descending path of said carriers on said elevator, a carriage movably mounted for reciprocable travel along said trackway, first drive means operably connected to said carriage for reciprocating said carriage along said trackway in opposing first and second directions, and second drive means operably connected to said trackway for:

raising said trackway portion as said carriage travels therealong in said first direction toward one of said descending carriers, to move said carriage upwardly into engagement with said one carrier for lifting and supporting said one carrier, and lowering said trackway portion as said carriage continues to travel therealong in said first direction, to move said one carrier downwardly as it travels horizontally in said first direction out of said descending path and toward engagement with said main conveyor, said trackway including a pair of sections articulated to each other at respective ends thereof, one of said sections being hingedly mounted at an opposite end and extending below the plane of said elevator and the other of said sections being pivotally mounted at an opposite end thereof about a pivot point outside said plane of said elevator, said second drive means moving said trackway sections vertically in synchronism with movement of said carriage along said sections whereby said sections move vertically upwardly until said carriage engages a respective carrier and then move vertically downwardly.

15. The combination set forth in claim 14, wherein said second drive means includes a rotatably mounted cam having a cam groove therein, a cam rod connected to said other trackway section and having a cam roller mounted thereon and disposed in said groove.

16. The combination set forth in claim 14, wherein said carriage includes a pair of articulated sections, each said carriage section having a frame and wheel means mounted on said frame for rollably moving said frame along said trackway sections.

17. The combination set forth in claim 16, wherein said trackway section includes a pair of longitudinally disposed channel-shaped rails disposed in outwardly facing relation and said wheel means on each said frame includes pairs of rollers disposed within each said rail to rotate about vertical axes along said rails and pairs of rollers disposed within each said rail to rotate about horizontal axes along said rails.

18. The combination set forth in claim 16, wherein said first drive means includes an endless chain and an arm articulated at one end to said chain for movement therewith and articulated to a forward one of said carriage frames at an opposite end.

19. The combination set forth in claim 18, wherein said chain has an upper run and a parallel lower run whereby during movement of said arm along said upper run said carriage moves along said trackway towards said elevator and during movement of said arm along said lower run said carriage moves along said trackway away from said elevator.

20. The combination set forth in claim 14, wherein said first drive means includes a pair of rollers, an endless chain looped about said rollers and disposed below the plane of said horizontal path, and an arm articulated at one end of said chain for movement therewith and articulated to said carriage at an opposite end.

21. A conveyor system for conveying a plurality of carriers, comprising a main conveyor for moving a sequential series of said carriers along a generally horizontal path, and an elevator having vertically spaced supports for sequentially conveying said carriers in a descending path; a relatch assembly for sequentially moving each carrier from said elevator supports into latched relationship with said main conveyor, said relatch assembly comprising:

a generally horizontal trackway having a portion thereof arranged in said descending path of said carriers on said elevator, a carrier movably mounted for reciprocable travel along said trackway, first drive means operably connected to said carriage for reciprocating said carriage along said trackway in opposing first and second directions, and second drive means operably connected to said trackway for:

raising said trackway portion as said carriage travels therealong in said first direction toward one of said descending carriers, to move said carriage upwardly into engagement with said one carrier for lifting and supporting said one carrier, and lowering said trackway portion as said carriage continues to travel therealong in said first direction, to move said one carrier downwardly as it travels horizontally in said first direction out of said descending path and toward engagement with said main conveyor, each said carrier having a rod at a forward end thereof and a pair of depending hooks on said rod; said main conveyor having a plurality of longitudinally spaced hooks for respectively engaging said rod of each respective carrier and an endless chain for moving said hooks of said main conveyor along said generally horizontal path.

22. The combination set forth in claim 20, wherein one of said rollers is positioned in correspondence to a hook of said main conveyor to permit disengagement of said rod means from a carrier prior to a return of said carriage.

23. A conveyor system for conveying a plurality of carriers, comprising a main conveyor for moving a sequential series of said carriers along a generally horizontal path, and an elevator having vertically spaced supports for sequentially conveying said carriers in a descending path; a relatch assembly for sequentially moving each carrier from said elevator supports into latched relationship with said main conveyor, said relatch assembly comprising:

a generally horizontal trackway having a portion thereof arranged in said descending path of said carriers on said elevator, a carrier movably mounted for reciprocable travel along said trackway, first drive means operably connected to said carriage for reciprocating said carriage along said trackway in opposing first and second directions, second drive means operably connected to said trackway for:

raising said trackway portion as said carriage travels therealong in said first direction toward one of said descending carriers, to move said carriage upwardly into engagement with said one carrier for lifting and supporting said one carrier, and lowering said trackway portion as said carriage continues to travel therealong in said first direction, to move said one carrier downwardly as it travels horizontally in said first direction out of said descending path and toward engagement with said main conveyor, a ramp disposed at a side of said elevator to which said carriers are discharged, said ramp including a receiving end onto which said carriers may be advanced by said carriage as the latter descends, and means for lowering said receiving end of said ramp as a carrier is being advanced thereonto to move said ramp from an orientation inclined relative to horizontal for receiving a carrier, to an orientation which is generally horizontal and arranged to enable said carrier to be conveyed by said main conveyor.

24. The combination set forth in claim 23, wherein an end ramp opposite said receiving end is pivotably mounted on a horizontal axis.

25. The combination set forth in claim 23, wherein said first drive means is connected to said ramp to move said ramp vertically upwardly and downwardly in synchronism with the upward and downward movement of said carriage.

* * * * *